(12) United States Patent
Kim et al.

(10) Patent No.: US 9,570,767 B2
(45) Date of Patent: Feb. 14, 2017

(54) MEMBRANE HUMIDIFIER FOR A FUEL CELL

(71) Applicant: Hyundai Motor Company, Seoul (KR)

(72) Inventors: Hyunyoo Kim, Gyeonggi-do (KR); Hyuckroul Kwon, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 335 days.

(21) Appl. No.: 13/678,913

(22) Filed: Nov. 16, 2012

(65) Prior Publication Data
US 2014/0054804 A1 Feb. 27, 2014

(30) Foreign Application Priority Data
Aug. 22, 2012 (KR) .................. 10-2012-0091698

(51) Int. Cl.
| | | |
|---|---|---|
| *B01D 61/00* | (2006.01) | |
| *H01M 8/04* | (2016.01) | |
| *B01D 63/04* | (2006.01) | |
| *B01D 63/02* | (2006.01) | |

(52) U.S. Cl.
CPC ........ *H01M 8/04149* (2013.01); *B01D 63/022* (2013.01); *B01D 63/04* (2013.01); *B01D 61/00* (2013.01); *B01D 63/02* (2013.01); *B01D 2313/13* (2013.01); *B01D 2313/20* (2013.01); *Y02E 60/50* (2013.01)

(58) Field of Classification Search
CPC ...... B01J 19/32; H01M 8/04149; H01M 8/04; B01D 63/022; B01D 61/00; B01D 2313/13; B01D 2313/20; B01D 61/02; B01D 63/02–63/024; B01D 63/04–63/046; Y02E 60/50
USPC .......................... 261/100–107; 210/100–107
See application file for complete search history.

(56) References Cited

U.S. PATENT DOCUMENTS

| | | | | |
|---|---|---|---|---|
| 5,066,397 A | * | 11/1991 | Muto ..................... | B01D 63/02 210/321.61 |
| 2002/0024155 A1 | | 2/2002 | Kusano et al. | |
| 2010/0151337 A1 | | 6/2010 | Kanazawa | |
| 2011/0000842 A1 | * | 1/2011 | Takagi ....................... | 210/321.6 |

FOREIGN PATENT DOCUMENTS

| | | |
|---|---|---|
| JP | 2004139784 A | 5/2004 |
| KR | 10-2003-0044071 A | 6/2003 |
| KR | 10-2004-0097831 A | 11/2004 |

(Continued)

OTHER PUBLICATIONS

Office Action from Chinese Patent Office for Chinese Application No. 201210505796.7, dated Jul. 4, 2016, English translation, 13 pages.

*Primary Examiner* — T. Bennett McKenzie
(74) *Attorney, Agent, or Firm* — Mintz Levin Cohn Ferris Glovsky and Popeo, P.C.; Peter F. Corless

(57) ABSTRACT

The present disclosure provides a membrane humidifier for a fuel cell including: a case; a hollow fiber membrane module covering the case; a housing coupled to both ends of the hollow fiber membrane module; a plurality of hollow fiber membranes arranged in the case; and a hollow fiber membrane guide structure installed at one end or both ends of the hollow fiber membrane module and having a potting material layer formed therein to fix the plurality of hollow fiber membranes.

9 Claims, 19 Drawing Sheets

(56) References Cited

FOREIGN PATENT DOCUMENTS

| KR | 10-2009-0013304 | 2/2009 |
|---|---|---|
| KR | 10-2010-0100325 | 9/2010 |
| KR | 10-2010-0125553 | 12/2010 |
| KR | 10-2012-0074507 A | 7/2012 |
| WO | 2011/068383 A2 | 6/2011 |
| WO | 2011068383 A3 | 11/2011 |

\* cited by examiner

DISASSEMBLED

◁┈┈┘ : WET AIR

◁ : DRY AIR

⬅ : HUMIDIFIED AIR

PRIOR ART

PRIOR ART

PRIOR ART

PRIOR ART

PRIOR ART

GAP FORMED BETWEEN POTTING MATERIAL AND CASE

PRIOR ART

<DIVIDED BY FOUR>

<DIVIDED BY EIGHT>

<DIVIDED BY 12>

PRIOR ART

MEMBRANE HUMIDIFIER FOR A FUEL CELL

CROSS-REFERENCE TO RELATED APPLICATION

This application claims priority under 35 U.S.C. §119(a) to Korean Patent Application No. 10-2012-0091698, filed on Aug. 22, 2012, which is incorporated herein by reference in its entirety.

BACKGROUND OF THE INVENTION

Field of the Invention

The present invention relates to a membrane humidifier for a fuel cell.

Description of Related Art

A fuel cell includes a fuel cell stack to generate electric energy, a fuel supply system to supply fuel (e.g., hydrogen) to the fuel cell stack, an air supply system to supply oxygen, which is contained in the air and serves as an oxidizer required for an electrochemical reaction, to the fuel cell stack, and a heat and water management system to control the operation temperature of the fuel cell stack.

Referring to FIG. 1, the air supply system of the fuel cell includes an air blower 30 to supply external air to a cathode of the fuel cell stack 10, and a membrane humidifier 20 to humidify the air supplied from the air blower 30 and then supply the humidified air to the cathode of the fuel cell stack 10.

In the case of a polymer electrolyte membrane fuel cell, water is required for the operation of the fuel cell, and a humidifier for humidifying the air is typically used. In order to humidify the air, various methods may be used such as, for example, a bubbler, injection, and an absorbent may be used. However, since the size of a fuel cell used for a vehicle is significantly constrained, fuel cell vehicles use a membrane humidifier that has a relatively small volume and requires no power.

FIGS. 2 and 3 illustrate a conventional membrane humidifier. Such a membrane humidifier includes a housing 100, a hollow fiber membrane module 200, and manifolds 106 and 108. The housing 100 includes an inlet 102 formed on one side end thereof to receive external air (e.g., dry air) from the air blower 30 and an outlet 104 formed on the other side end thereof to discharge humidified air toward the fuel cell stack 10. The manifold 106 is formed on the top surface of the housing 100 proximate to outlet 104 to receive wet air discharged from the stack, and the manifold 108 is formed on the bottom surface of the housing 100 proximate to inlet 102 to discharge the wet air, obtained by humidifying the air from the air blower, to the outside.

Furthermore, the hollow fiber membrane module 200 includes a bundle of hollow fiber membranes 202 housed therein, and the housing 100 having the manifolds 106 and 108 formed therein is coupled to both ends of the hollow fiber membrane module 200 so as to surround the hollow fiber membrane module 200.

The operation of the conventional membrane humidifier having the above-described structure will be described briefly as follows.

As shown in FIG. 3, when wet air discharged from the fuel cell stack is supplied to the inside of the hollow fiber module 200 through the manifold 106 of the housing 100, water contained in the wet air is separated by the capillary action of the respective hollow fiber membranes 202 housed in the housing 100. The separated water is condensed while passing through capillary tubes of the hollow fiber membranes 202, and moved into the hollow fiber membranes 202. At this time, the wet air from which the water is separated is moved to the outside of the hollow fiber membranes 202 and discharged as external air through the manifold 108 of the housing 100.

The external air (e.g., dry air) supplied from the air blower 30 through the inlet 102 of the housing 100 is moved while passing through the hollow fiber membranes 202. At this time, since the water separated from the wet air is already moved into the hollow fiber membranes 202, the dry air is humidified by the water. The humidified air is supplied toward the fuel cell stack 10 through the outlet 104.

Hereinafter, a conventional method for manufacturing the hollow fiber membrane module of the membrane humidifier having the above-described structure and operation will be described as follows.

First, a case is manufactured, and a desired number of hollow fiber membranes are housed therein. Then, a polymer material is injected into both ends of the hollow fiber membranes to fix the hollow fiber membranes to the case. This process is referred to as "potting" or a "potting process." The polymer material used for potting may include a urethane-based resin material, and the potting process may include a dipping process and a centrifugal molding process. The dipping process takes advantage of the use of gravity, as illustrated in FIG. 4, and is performed as follows. First, a case 204 having a bundle of hollow fiber membranes 202 housed therein is inserted into a resin injection device. Then, when a polymer material is injected through an inlet of the resin injection device, the injected polymer material fixes the bundle of hollow fiber membranes while permeating between the densely-housed hollow fiber membranes due to gravity.

FIGS. 5A to 5D are diagrams illustrating such a potting process. The potting process includes preparing a case as in FIG. 5A, putting a potting cap 300 on as in FIG. 5B, inserting the hollow fiber membranes 202 as in FIG. 5C, and injecting resin 310 as in FIG. 5D. As illustrated in FIG. 6, the potting material is injected into the case through a hole 110.

After the potting process, the polymer material is dried, and an end of the potted portion is partially cut by a cutting device. Then, a hollow fiber membrane module having a cross-sectional structure as illustrated in FIG. 6 may be obtained.

In accordance with the conventional method, the potting material repetitively contracts and expands according to temperature changes. As a result of the repetitive contraction and expansion of the potting material, a gap 320 may be formed between the potting material 310 and the case 204 after a predetermined time passes, as illustrated in FIGS. 7A and 7B. Because of the gap 320, air tightness may not be maintained. FIG. 8 is a photograph showing a state in which a gap is formed between the potting material and the case.

In the conventional method, an air flow within the humidifier may apply stress to the polymer hollow fiber membranes. In this case, a hollow fiber membrane may be cut at a portion where the hollow fiber membrane is contacted with the bottom of the potting material 310.

Furthermore, when the polymer hollow fiber membrane is potted by a potting material, the potted portion of the hollow fiber membrane does not function as a humidifying membrane. That is, as the potted portion is formed to a large thickness, the humidification performance of the humidifier decreases. Accordingly, there is a need for a membrane-based humidifier that does not deform under physical stress (e.g., temperature induced expansion/contraction, air pressure, etc.), and therefore does not form a gap, as well as for a membrane that maintains humidification performance even as a thick membrane.

SUMMARY OF THE INVENTION

The present invention provides a membrane humidifier for a fuel cell having a specific structure, which is capable of preventing formation of a gap between a porting material and a case. The present invention is also directed to a membrane humidifier for a fuel cell having a specific structure, which is capable of preventing a hollow fiber membrane from being cut by an air flow within the humidifier, at a portion in which the hollow fiber membrane is contacted with the bottom of a porting material. The present invention is also directed to a membrane humidifier for a fuel cell having a specific structure, in which potted portions of polymer hollow fiber membranes potted by a potting material may function as humidifying membranes.

Other objects and advantages of the present invention can be understood by the following description, and become apparent with reference to the exemplary embodiments of the present invention.

In accordance with an exemplary embodiment of the present invention, a membrane humidifier for a fuel cell may include: a case; a hollow fiber membrane module covering the case; a housing coupled to both ends of the hollow fiber membrane module; a plurality of hollow fiber membranes arranged in the case; and a hollow fiber membrane guide installed at one end, or both ends, of the hollow fiber membrane module and having a potting material layer formed therein to fix the plurality of hollow fiber membranes.

The inside of the hollow fiber membrane guide may be divided to uniformly partition the plurality of hollow fiber membranes. The inside of the hollow fiber membrane guide may be divided into four parts, eight parts, or 12 parts.

The plurality of hollow fiber membranes may be arranged in the case so as to be uniformly distributed to the divided hollow fiber membrane guide.

Furthermore, a potting material of the potting material may be divided by the divided hollow fiber membrane guide.

BRIEF DESCRIPTION OF THE DRAWINGS

Throughout the disclosure, like reference numerals refer to like parts throughout the various figures and embodiments of the present invention.

DESCRIPTION OF SPECIFIC EMBODIMENTS

Exemplary embodiments of the present invention will be described below in more detail with reference to the accompanying drawings. The present invention may, however, be embodied in different forms and should not be construed as being limited to the exemplary embodiments set forth herein. Rather, these exemplary embodiments are provided so that this disclosure will be thorough and complete, and will fully convey the scope of the present invention to those skilled in the art.

Although terms "first", "second" and the like may be used to describe various components, the components must not be limited by the terms. The terms are used only to discriminate one component from other components. For example, a first component may be referred to as a second component, and the second component may be referred to as the first component, without departing from the scope of the present invention. Furthermore, a term "and/or" may include a combination of related items or any one of the related items.

Terms used herein, including technical or scientific terms, may have the same meanings as those understood by those skilled in the art to which the present invention pertains, as long as they are defined in a different manner.

Terms as defined in a generally-used dictionary should be analyzed to have the same meanings as in contexts of the related technology, and must not be analyzed as ideal or excessively-formal meanings, as long as they are not defined in this specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereafter, a membrane humidifier for a fuel cell having a specific structure in accordance with an exemplary embodiment of the present invention will be described with reference to the accompanying drawings.

Figure 1:
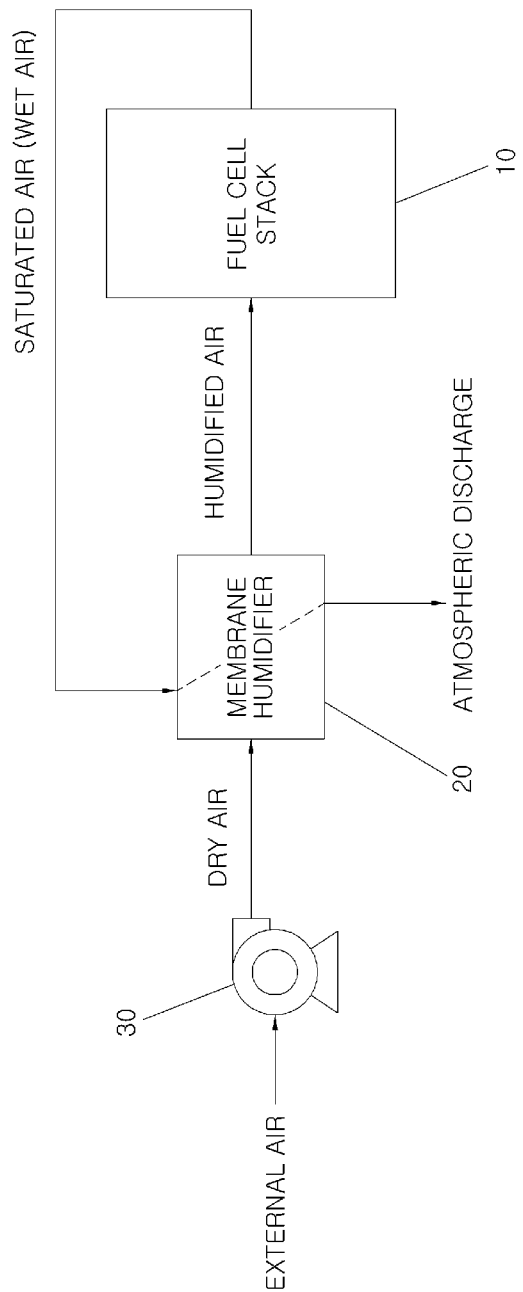
FIG. 1 is a schematic view illustrating an air supply system of a conventional fuel cell.
Figure 2:
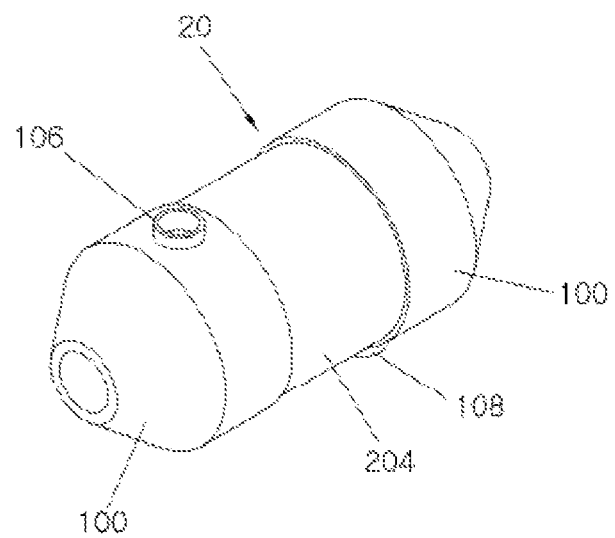
FIGS. 2 and 3 are perspective and cross-sectional views of a conventional membrane humidifier.
Figure 2:
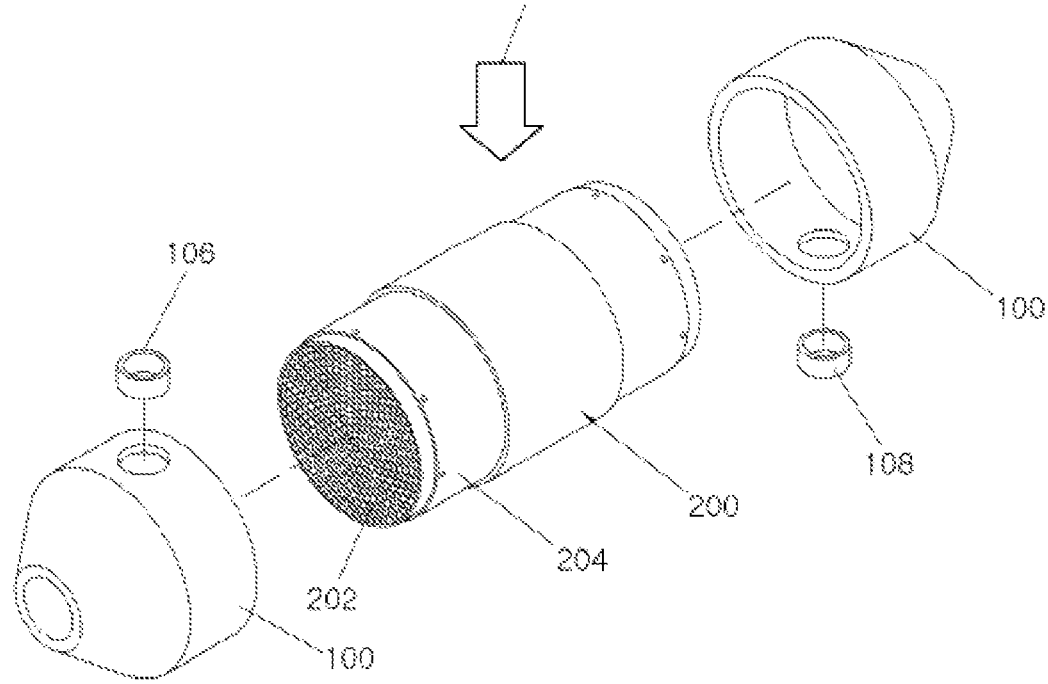
Figure 3:
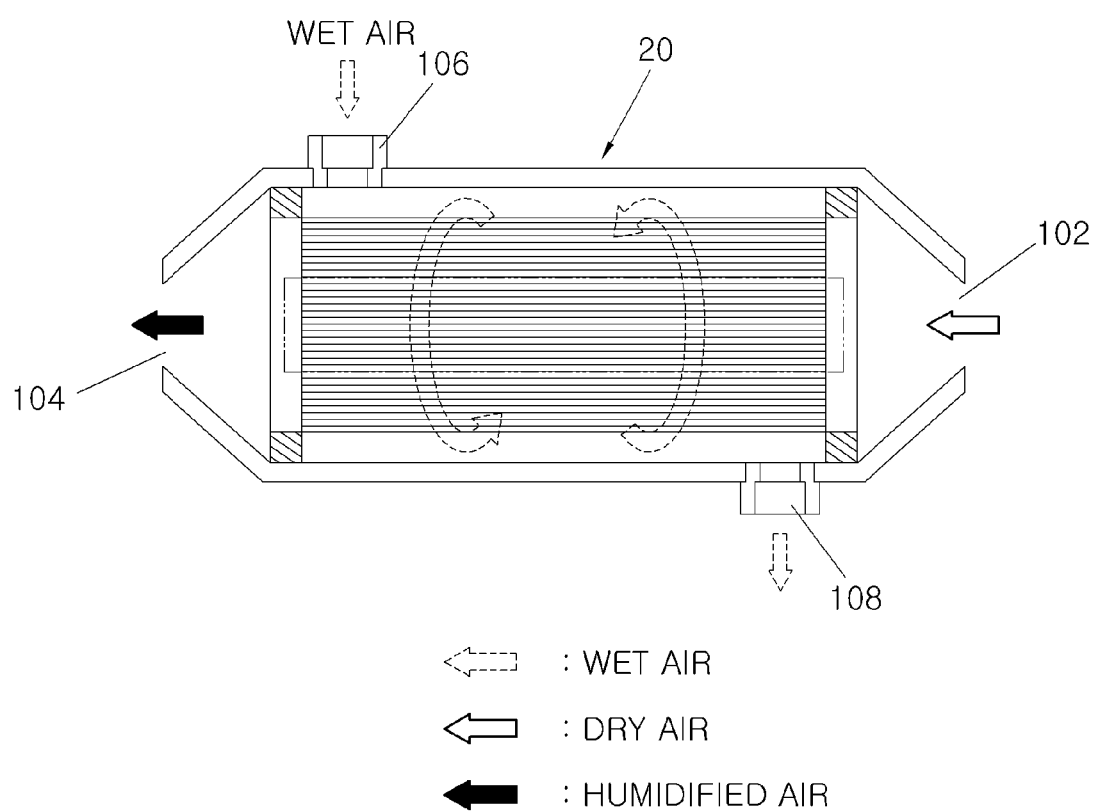
Figure 4:
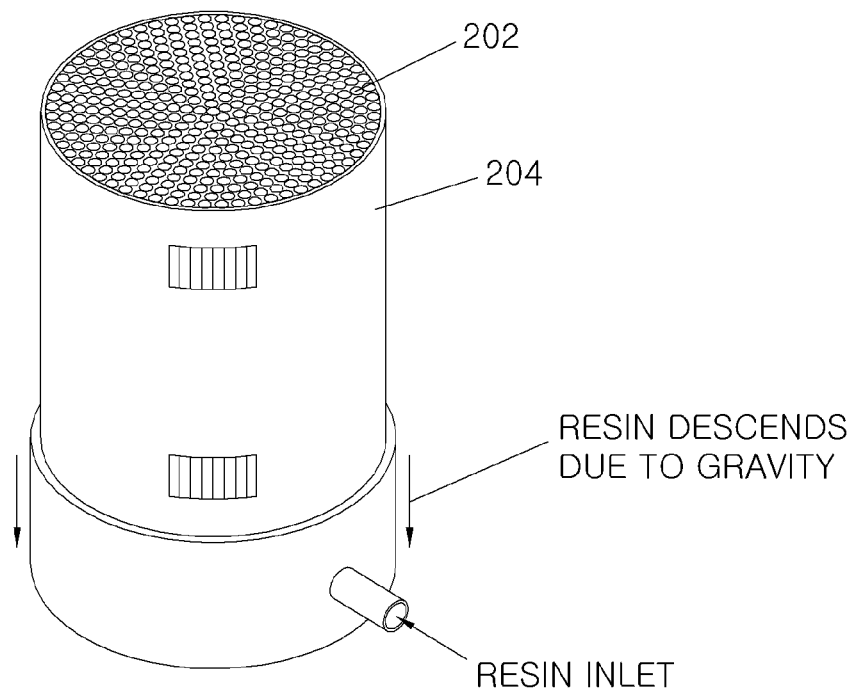
FIG. 4 is a schematic view for explaining a potting process for a hollow fiber membrane module included in the conventional membrane humidifier.
Figure 5A:
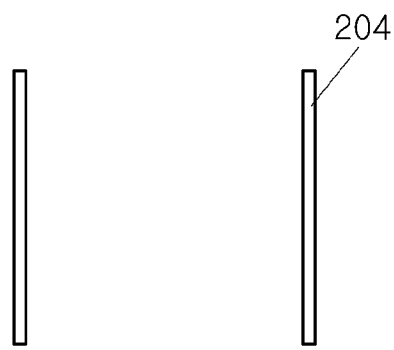
FIGS. 5A to 5D illustrate a conventional potting process.
Figure 5B:
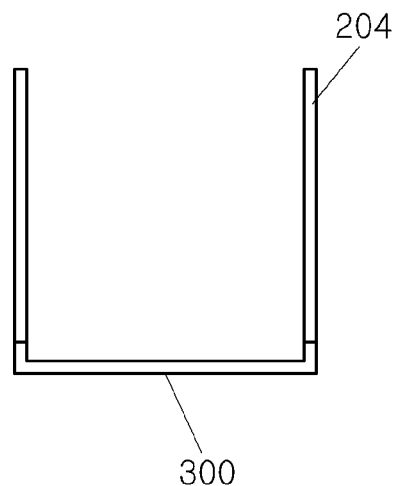
Figure 5C:
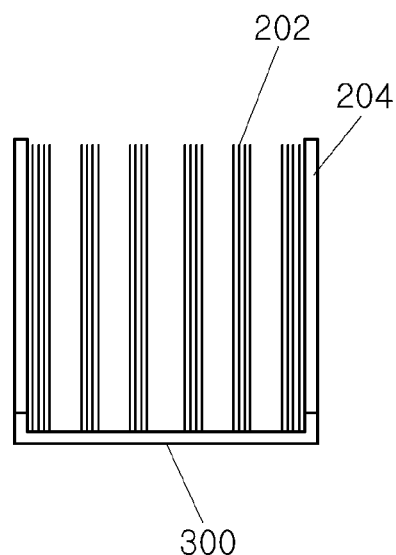
Figure 5D:
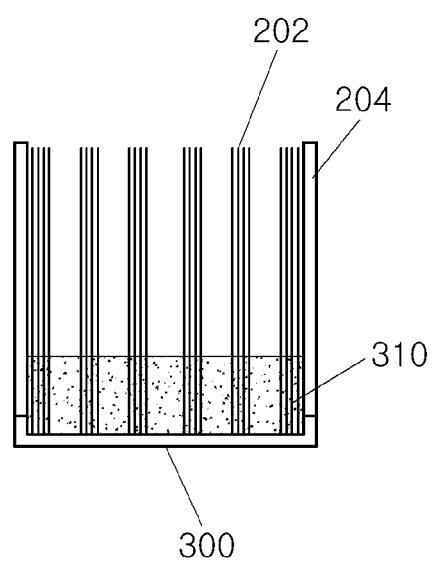
Figure 6:
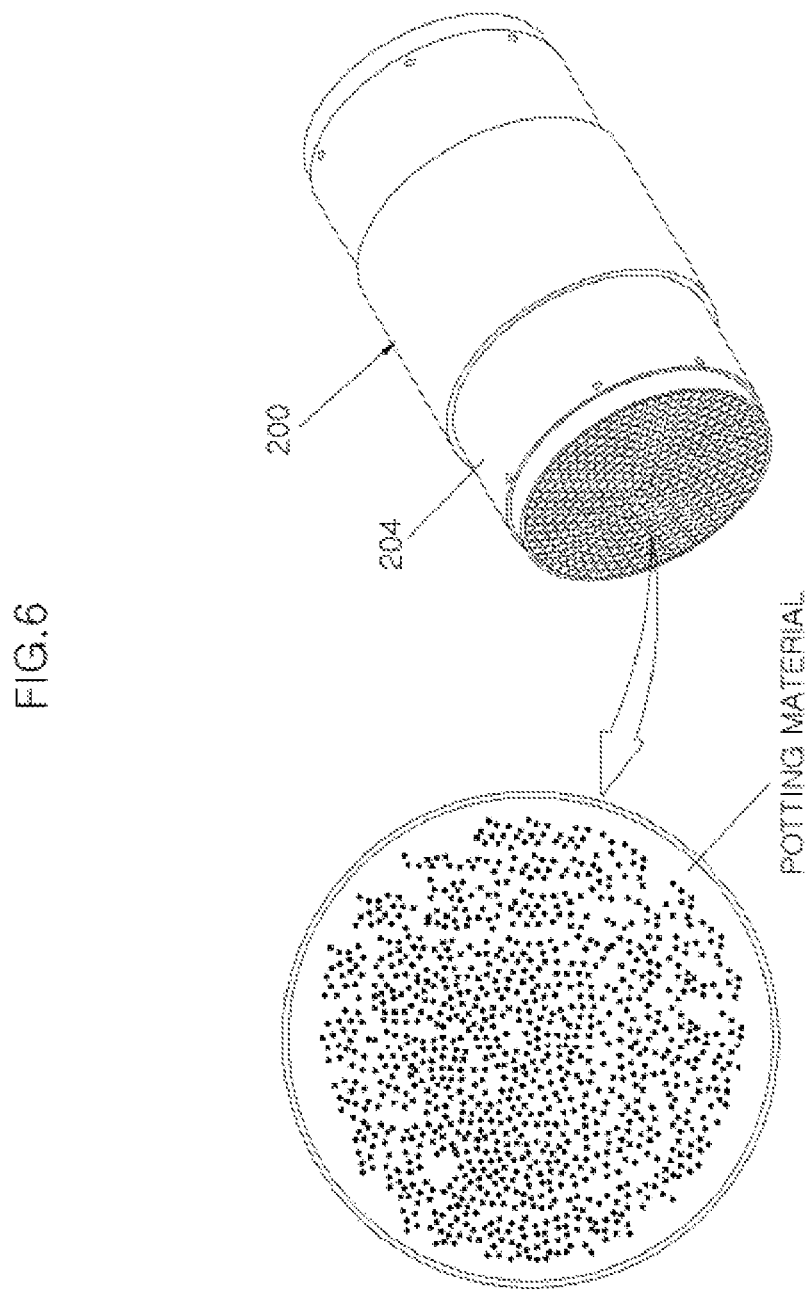
FIG. 6 is a perspective view of the hollow fiber membrane module after a conventional potting process.
Figure 7A:
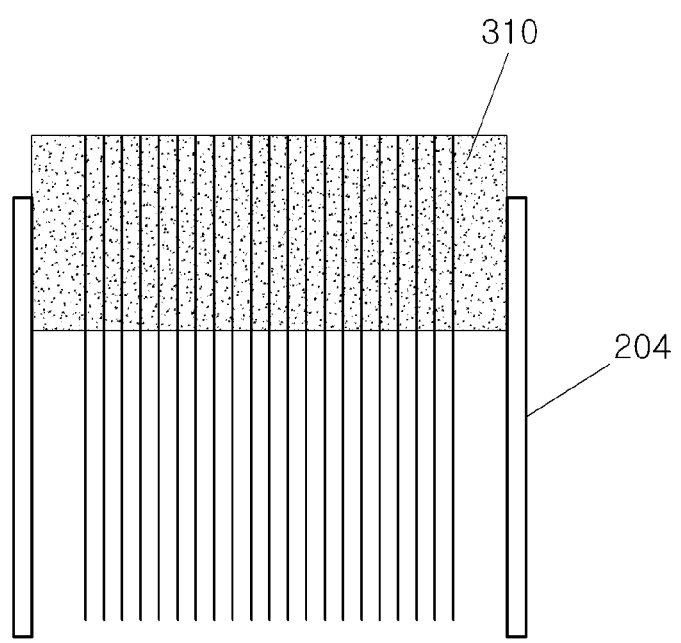
FIGS. 7A and 7B are diagrams illustrating that a conventional potting material may form a gap with respect to a housing case.
Figure 7B:
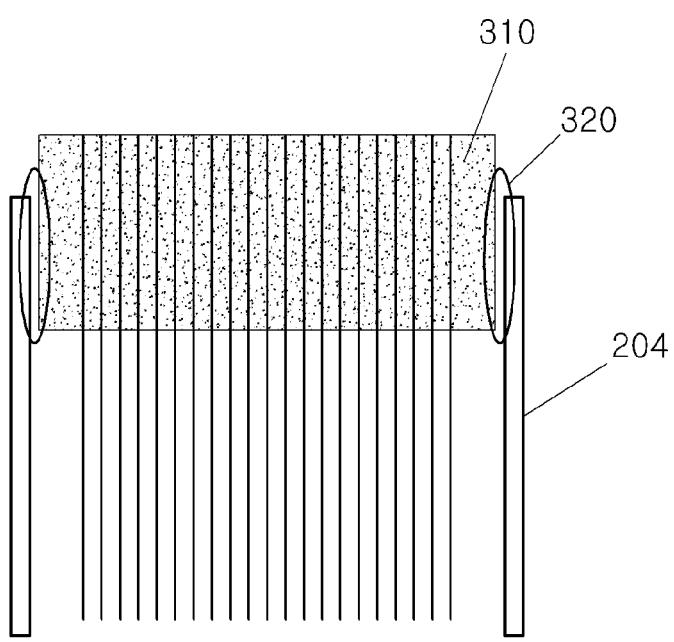
Figure 8:
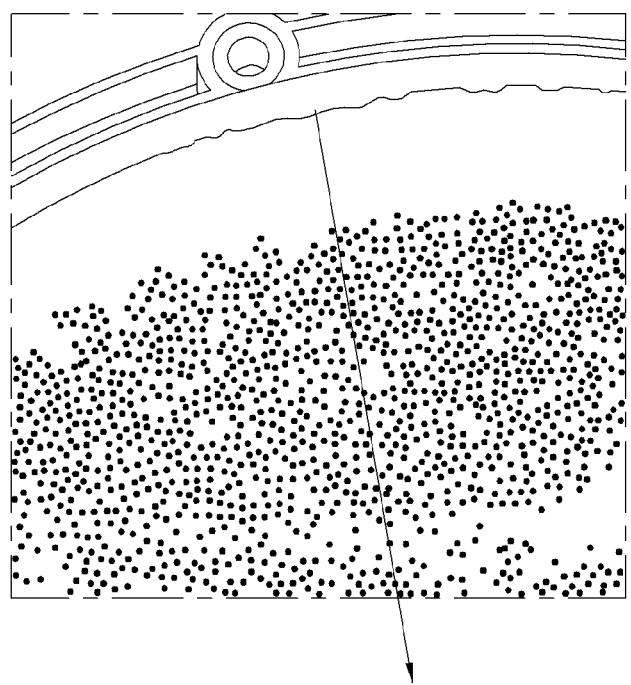
FIG. 8 is a drawing showing an example in which a conventional potting material has separated from the housing case as illustrated in FIG. 7.
Figure 9:
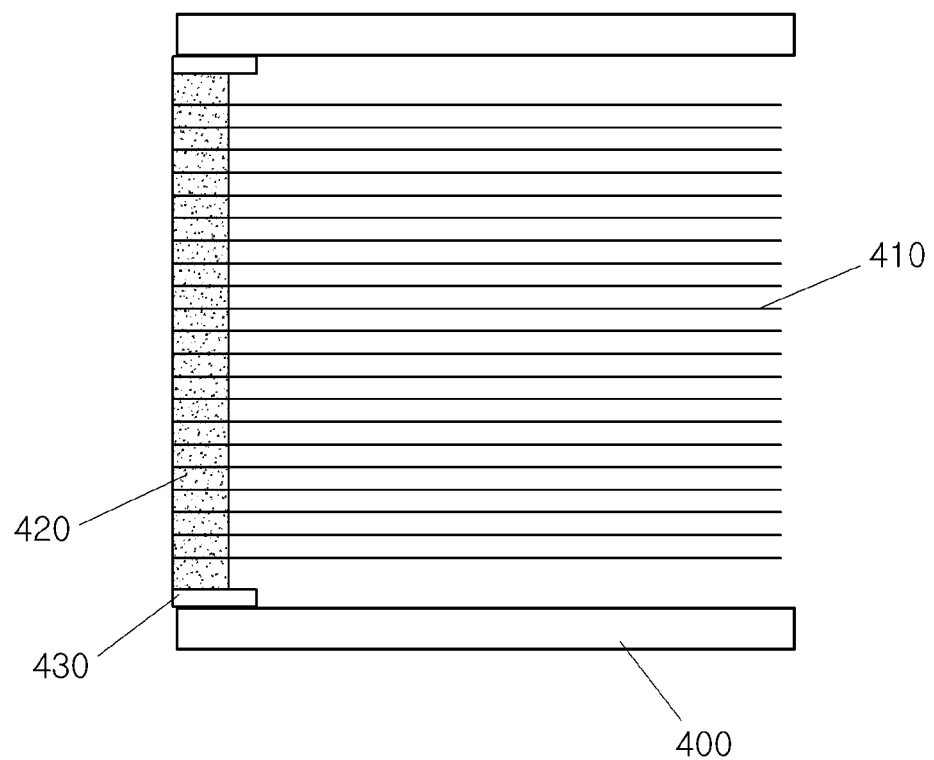
FIG. 9 is a conceptual view of a hollow fiber membrane module to which a structure in accordance with an exemplary embodiment of the present invention is applied.

FIG. 9 is a conceptual view of a hollow fiber membrane module to which the structure in accordance with an exemplary embodiment of the present invention is applied. Referring to FIG. 9, a hollow fiber membrane guide 430 may be installed at one side of a case 400. For convenience of description, FIG. 9 illustrates that the hollow fiber membrane guide 430 may be installed only at the left side of the case 400. However, the hollow membrane guide 430 may be installed at either or both ends of the case 400.

Inside the case, a plurality of hollow fiber membranes 410 may be arranged at a predetermined distance from each other. Furthermore, a potting material layer 430 for fixing the plurality of hollow fiber membranes 410 may be formed inside the hollow fiber membrane guide 430. The potting material layer 420 may be formed by the processes of preparing a case, putting a potting cap on, inserting hollow fiber membranes, and injecting resin, as illustrated in FIG. 5.

In this exemplary embodiment of the present invention, a process of installing the hollow fiber guide 430 in the prepared case 400 may additionally be performed after the process of preparing the case. Specifically, the case 400 may be first manufactured and prepared at step S1. When the case 400 is prepared, the hollow fiber membrane guide 430 may be installed after one side of the case 400 is covered with a potting cap, and the hollow fiber guide 430 may be installed at step S2. Then, a desired number of hollow fiber membranes may be housed in the case 400 at step S3. Then, a polymer material may be injected into both ends of the hollow fiber membranes so as to fix the hollow fiber membranes to the case 400 at step S4. This process is referred to as a potting process.

In this embodiment of the present invention, gravity is used as illustrated in FIGS. 5A to 5D. Specifically, a polymer material may be injected through a resin inlet (not illustrated), and then fixes the hollow fiber membranes while permeating between the densely-formed hollow fiber membranes due to the gravity. At this time, the bundle of hollow fiber membranes may also be fixed in the potting material layer 420 by the resin.

Figure 10:
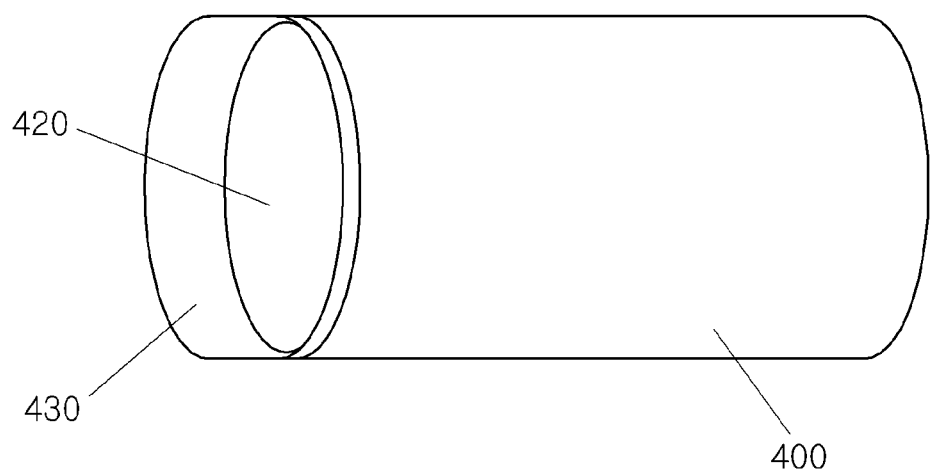
FIG. 10 is a partial perspective view of an exemplary hollow fiber membrane module of FIG. 9.

FIG. 10 is a partial perspective view of the hollow fiber membrane module illustrated in FIG. 9. Referring to FIG. 10, the hollow fiber guide 430 may be installed at the top of the case 400. The hollow fiber guide 430 may serve as a guide for the hollow fiber membranes and thus prevent the membranes from being cut by an air flow, unlike the conventional membrane humidifier.

Figure 11A:
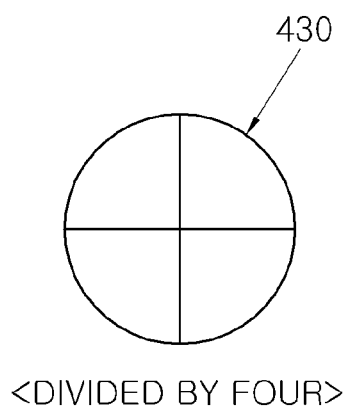
FIGS. 11A to 11C are conceptual views illustrating the shape of an exemplary structure illustrated in FIG. 9 or 10.
Figure 11B:
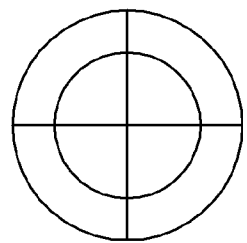
Figure 11C:
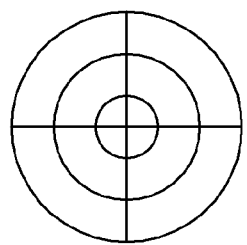

FIGS. 11A to 11C are conceptual views illustrating the cross-sectional shape of the hollow fiber guide 430 illustrated in FIG. 9 or 10. Referring to FIGS. 11A to 11C, the hollow fiber guide 430 may be divided in various manners.

FIG. 11A illustrates that the inside of the hollow fiber membrane guide 430 may be divided into four parts. FIG. 11B illustrates that the inside of the hollow fiber membrane guide 430 may be divided into eight parts. FIG. 11C illustrates that the inside of the hollow fiber membrane guide 430 may be divided into 12 parts. These are only examples, and the inside of the hollow fiber membrane guide 430 may be divided into a variety of parts and/or a variety of shapes such as, for example, a rectangular shape, polygonal shape, circular shape, etc.

That is, the inside of the hollow fiber guide 430 may be divided into four parts, eight parts, or 12 parts. Simultaneously, the potting material of the potting material layer 420 of FIG. 9 may be divided by the hollow fiber membrane structures. Therefore, the plurality of hollow fiber membranes housed in the case are uniformly distributed in the divided hollow fiber membrane guide 430 and the case 400.

Figure 12A:
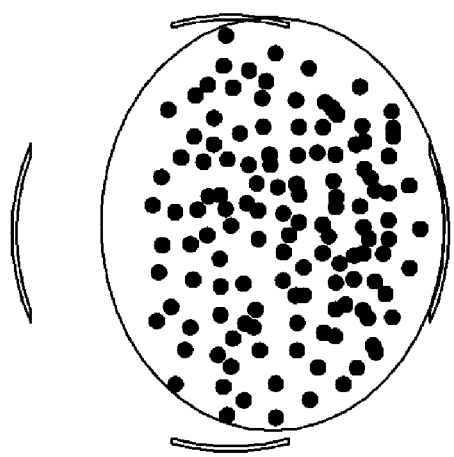
FIGS. 12A and 12B are conceptual views illustrating the effect of the structure in accordance with an exemplary embodiment of the present invention, compared to the conventional structure.
Figure 12B:
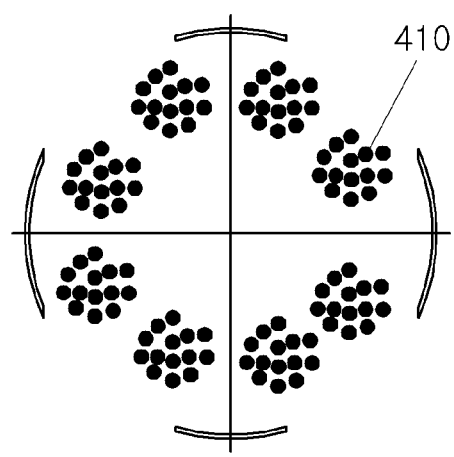

FIGS. 12A and 12B are conceptual views illustrating the effect of the membrane humidifier in accordance with an exemplary embodiment of the present invention, compared to the conventional membrane humidifier. FIG. 12A illustrates an arrangement state of the hollow fiber membranes in a conventional membrane humidifier, and FIG. 12B illustrates an arrangement state of the hollow fiber membranes in the membrane humidifier in accordance with an exemplary embodiment of the present invention. Specifically, FIG. 12A illustrates a state in which the hollow fiber membranes are not uniformly distributed, but rather distributed on one side (e.g., bunched up). However, FIG. 12B illustrates a state in which the hollow fiber membranes are not cornered in onside, but uniformly distributed and arranged.

Therefore, the amount of the potting material may be reduced by the application of the structure in accordance with an exemplary embodiment of the present invention. Furthermore, in the conventional membrane humidifier, only the potting layer supports the membranes. In an exemplary embodiment of the present invention, however, the hollow fiber membrane structure and the potting layer support the membranes. Therefore, it may possible to minimize the thickness of the potting layer. This means that the area of the hollow fiber membranes, which is not used in the conventional membrane humidifier because of the potting layer, may be increased.

Furthermore, as the hollow fiber membranes are uniformly distributed, the entire hollow fiber membranes may be uniformly used in terms of the performance of the humidifier. Therefore, the performance of the membrane humidifier may be improved. Since the performance improvement of the membrane humidifier means a reduction in the number of membranes, it is possible to reduce the manufacturing cost.

Furthermore, as the structure having a specific shape divided into a desired number of parts is installed at the top of one side of the case, the area of the potting material may be divided to minimize a thermal deformation caused by the contraction and expansion of the potting material. Therefore, it is possible to prevent a gap between the potting material and the case.

While the present invention has been described with respect to the specific embodiments, it will be apparent to those skilled in the art that various changes and modifications may be made without departing from the spirit and scope of the invention as defined in the following claims.

What is claimed is:

1. A membrane humidifier, comprising:
a case with a first end and a second end;
a hollow fiber membrane module with a first end and a second end;
a first housing with an inlet and a first case joining end;
a second housing with an outlet and a second case joining end;
a plurality of hollow fiber membranes; and
a hollow fiber membrane guide,
wherein the plurality of hollow fiber membranes are located within the case,
the case is located within the hollow fiber membrane module so that when the first housing is fitted onto the first case end, the first case joining end abuts the first end of the hollow fiber membrane module, and when the second housing is fitted onto the second case end, the second case joining end abuts the second end of the hollow fiber membrane module, and
the hollow fiber membrane guide is circumferentially connected to an end of the case,
the hollow fiber membrane guide includes a potting material layer formed therein,
the hollow fiber membrane guide is a structure positioned between the potting material layer and the case, and
the potting material layer is divided at particular locations around the hollow fiber membrane guide to prevent thermal deformation causes by contraction and expansion of the potting material layer.

2. The membrane humidifier of claim 1, wherein the hollow fiber membrane guide is circumferentially connected to the first end of the case.

3. The membrane humidifier of claim 1, wherein the hollow fiber membrane guide is circumferentially connected to the second end of the case.

4. The membrane humidifier of claim 1, wherein the hollow fiber membrane guide is circumferentially connected to the first end and the second end of the case.

5. The membrane humidifier of claim 1, wherein the potting material layer affixes the plurality of hollow fiber membranes.

6. The membrane humidifier of claim 1, wherein an interior surface of the hollow fiber membrane guide is divided into four parts, eight parts, or 12 parts.

7. The membrane humidifier of claim 1, wherein the plurality of hollow fiber membranes are arranged in the case so as to be uniformly distributed according to the desired number of the divided hollow fiber membrane guides.

8. The membrane humidifier of claim 1, wherein the plurality of hollow fiber membranes are arranged in the case so as to be uniformly distributed according to the desired pattern of the divided hollow fiber membrane guides.

9. The membrane humidifier of claim 1, wherein the potting material is divided by the divided hollow fiber membrane guides.

\* \* \* \* \*